United States Patent

[11] 3,561,560

[72] Inventor Alfred J. Ford
Launceston, Tasmania, Australia

[21] Appl. No. 758,318
[22] Filed Sept. 9, 1968
[45] Patented Feb. 9, 1971
[73] Assignee Air Cushion Vehicles Australasia Pty. Ltd.
Launceston, Tasmania, Australia
[32] Priority Oct. 13, 1967
[33] Australia
[31] 28481/67

[54] FLEXIBLE STRUCTURE FOR AIR CUSHION VEHICLES
21 Claims, 18 Drawing Figs.

[52] U.S. Cl. .......... 180/128, 135/15; 180/118, 180/126
[51] Int. Cl. .......... B60v 1/04, B60v 1/16
[50] Field of Search .......... 180/128, 127, 124, 126, 121, 118

[56] References Cited

UNITED STATES PATENTS

| | | | |
|---|---|---|---|
| 3,268,021 | 8/1966 | Jones et al. | 180/128 |
| 3,357,514 | 12/1967 | Jones | 180/128 |
| 3,410,241 | 11/1968 | Hardy et al. | 180/128X |
| 3,420,329 | 1/1969 | Moore | 180/128 |

*Primary Examiner*—A. Harry Levy
*Attorney*—Woodhams, Blanchard & Flynn

ABSTRACT: This invention relates to a flexible structure for defining at least part of the periphery of a plenum chamber of an air cushion vehicle. The structure includes two sidewalls defining an open-top channel adapted to receive fluid under pressure from a pressure supply source, a closable fluid passage is defined along the base of the channel and a lip or flap forming a continuation of the lower edge of one of the sidewalls defines a valve member engageable with a reaction surface over which the vehicle is positioned to regulate escape of air from the plenum chamber beneath the flexible structure. The arrangement is such that the fluid pressure within the channel is maintained substantially equal to that within the plenum chamber.

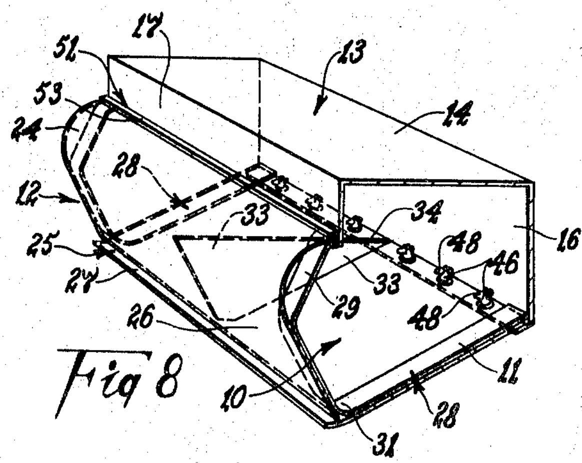
Fig 8
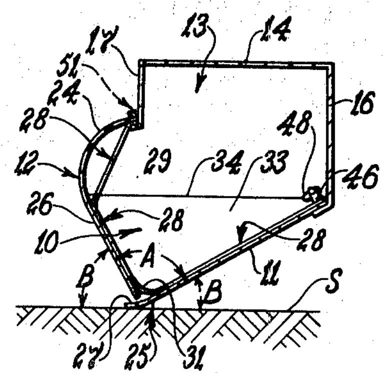
Fig 9
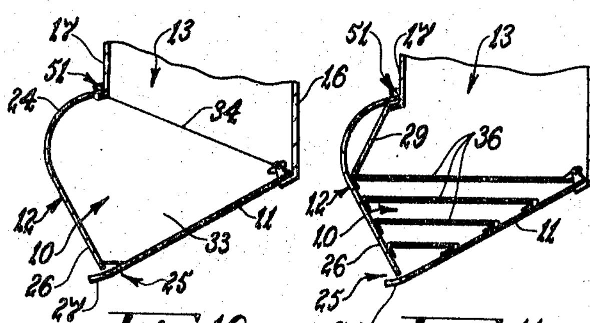
Fig 10
Fig 11
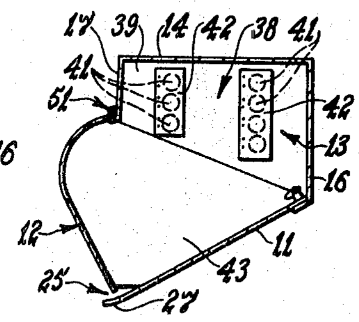
Fig 12
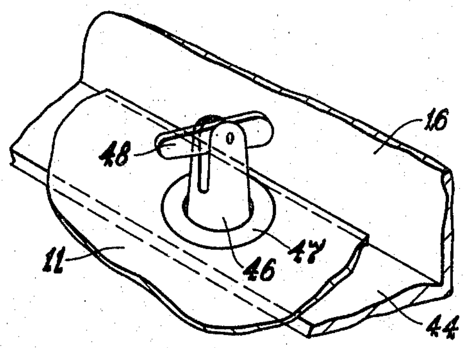
Fig 13
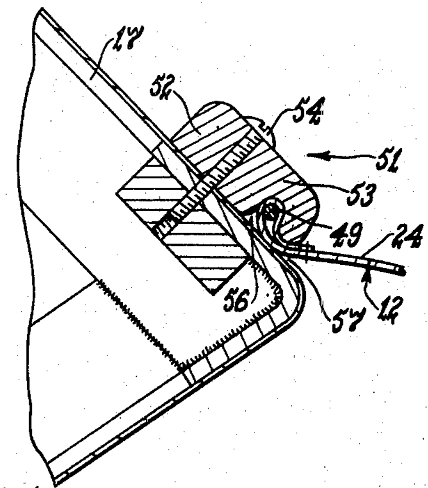
Fig 14

FLEXIBLE STRUCTURE FOR AIR CUSHION VEHICLES

This invention relates to a flexible structure of the kind used to define at least part of the periphery of the plenum chamber of an air cushion vehicle. That is, a vehicle which is adapted to be supported wholly or partially above a surface such as the ground or water by a cushion of air maintained at a pressure greater than the environmental atmospheric air.

The construction of such flexible structures, or skirts as they are sometimes called, is most important. For example, the skirt construction governs the stability of the vehicle, its load carrying capacity, and the power required to lift the vehicle a suitable distance above its supporting or reaction surface.

Hitherto, difficulty has been experienced in developing a flexible structure or skirt which will satisfy all of the foregoing requirements. One particular attempt at developing a satisfactory structure has involved the provision of crossed flexible panels within the plenum chamber so dividing that chamber into four separate sections. Such a construction is aimed mainly at achieving stability, but has not found wide acceptance because it is relatively expensive and is prone to severe wear during use.

It is a primary object of the present invention to provide a flexible structure or skirt for air cushion vehicles which improves the stability and load carrying capacity of a vehicle to which it is attached, and also reduces the power required to produce a given lift to the vehicle.

It is a further object of the invention to provide a flexible structure for defining at least part of the periphery of a plenum chamber of an air cushion vehicle, which structure is inflatable and includes a pressure equalizing valve such that the fluid pressure within the flexible structure is maintained substantially equal to that within the plenum chamber.

The following description refers in more detail to these essential features and further optional features of the invention. To facilitate an understanding of the invention, reference is made to the accompanying drawings where these features are illustrated in preferred form. It is to be understood however, that the essential and optional features of the invention are not limited to the specific forms of these features as shown in the drawings.

In the drawings:

FIG. 8 is a perspective view of portion of a skirt made in accordance with the present invention;

FIG. 9 is a t transverse cross-sectional view of the skirt assembly shown in FIG. 8;

FIG. 10 is a view similar to FIG. 9, but showing different retaining means within the skirt;

FIG. 11 is a view similar to FIG. 9, but showing yet another form of retaining means;

FIG. 12 is an enlarged cross-sectional view taken along line XII–XII of FIG. 6;

FIG. 13 is a fragmentary perspective view showing the means for attaching the inner wall of the skirt to the vehicle;

FIG. 14 is an enlarged cross-sectional view of the means for attaching the outer wall of the skirt to the vehicle;

The flexible structure or skirt of the present invention may be applied to an air cushion vehicle of any appropriate construction which is either of the self-propelled type or is motivated by a separate prime mover. For convenience however, the invention will be hereinafter described in relation to a typical vehicle of the self-propelled type.

Figure 2:
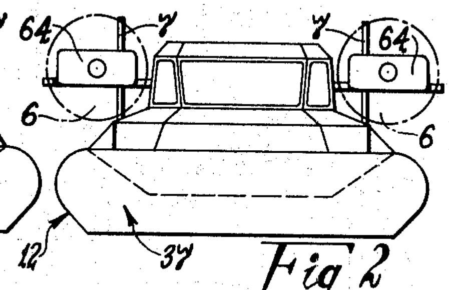
FIG. 2 is a front elevational view of the vehicle shown in FIG. 1.
Figure 3:
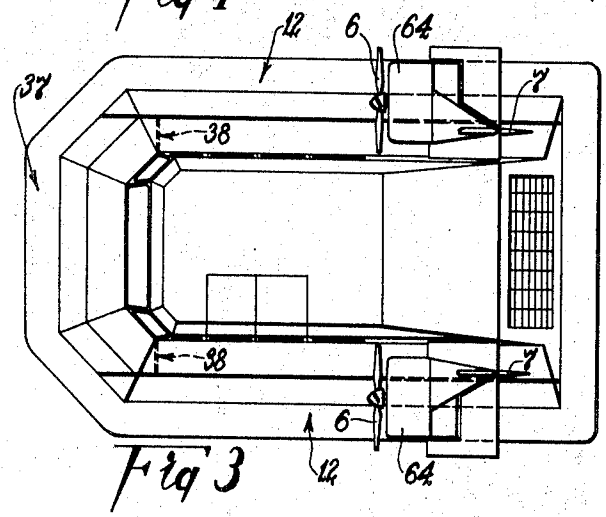
FIG. 3 is a plan view of the vehicle shown in FIG. 1.
Figure 4:
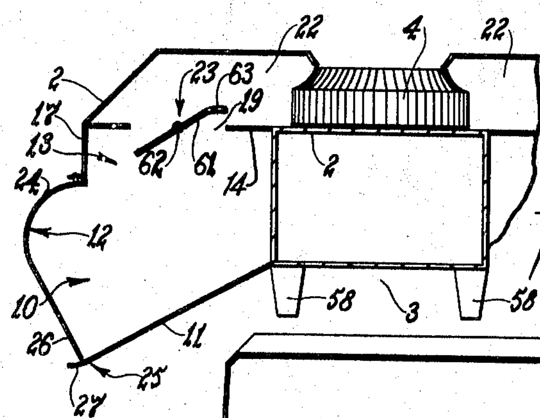
FIG. 4 is an enlarged semidiagrammatic transverse cross-sectional view of the vehicle shown in FIG. 1, illustrating a particular fan and duct arrangement.
Figure 5:
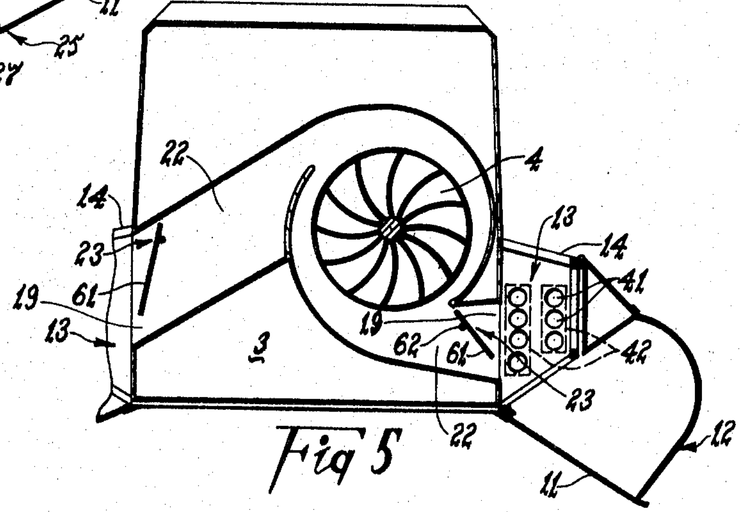
FIG. 5 is a view similar to FIG. 4, but showing an alternative and preferred fan and duct arrangement.

In one form as shown in FIGS. 1 to 7 of the drawings, such a typical vehicle includes a rigid load supporting platform or hull 2 having a plenum chamber 3 defined therebeneath and carrying pressure supply means for producing a cushion of pressurized air in the plenum chamber 3. The pressure supply means may be of any suitable form such as one or more draft inducing fans, or one or more compressed air tanks connected to the plenum chamber 3 through appropriate conduits and/or ducts. For preference however, the pressure supply means is a single centrifugal fan 4 as shown in FIG. 4 or 5.

A source of power (not shown) such as an internal combustion engine is also carried by the platform or hull 2 for operating the pressure supply means 4, and that same power source may be employed to drive propulsion means attached to the platform or hull 2, although a separate power source may be employed if desired. Preferably, the propulsion means includes one or more propellers 6 mounted on the platform or hull 2 adjacent the rear thereof and arranged so as to produce forward movement of the vehicle.

Provision may be made for causing reverse movement of the vehicle. For example, the pitch of the or each drive propeller 6 may be reversible, or a separate reversing propeller or propellers (not shown) may be mounted on the platform or hull 2.

Steering of the vehicle may be effected by one or more upright steering vanes 7 mounted adjacent the rear of the platform or hull 2. Alternatively or additionally, the or each drive propeller mounting 8 may be rotatable about an upright axis so as to allow alteration of the direction of thrust. Still further, a change of direction may be effected through one or more controllable lateral gas jets (not shown).

A cabin 9 for containing the vehicle operator and one or more passengers may be provided on the platform or hull 2 and includes the mechanism necessary for controlling operation of the vehicle.

In the typical vehicle shown in FIGS. 1 to 7 the aforementioned flexible structure or skirt is attached to the underside of the platform or hull 2 adjacent the outer peripheral edge thereof to form a continuous peripheral wall for the plenum chamber 3. As shown in FIGS. 8 to 12, the skirt includes inner and outer longitudinal wall sections 11 and 12 respectively, which define between them an open top channel 10, and air under pressure is preferably fed into that channel 10 from the pressure supply means 4 through a distribution duct 13 attached to or forming part of the platform or hull 2.

Any suitable flexible material such as "Terylene" sailcloth may be used to form the skirt. Ideally, the material should be relatively light in weight, have good wear resistance, and be such as to resist permanent deformation through stretching.

Preferably, the distribution duct 13 extends substantially the full length of the plenum chamber 3 (see FIG. 6), and has an upper wall 14, and an inner sidewall 16 and an outer sidewall 17, each depending from the wall 14 and defining an open mouth between their lower edges which communicates directly with the open top of the skirt channel 10 (see FIGS. 8 and 9). The outer sidewall 17 may form the outer surface of the platform or hull 2, in which case the outer and inner walls 12 and 11 of the skirt are preferably respectively secured at their upper edge portions to, or adjacent to, the lower edges of the sidewalls 17 and 16 respectively.

Figure 6:
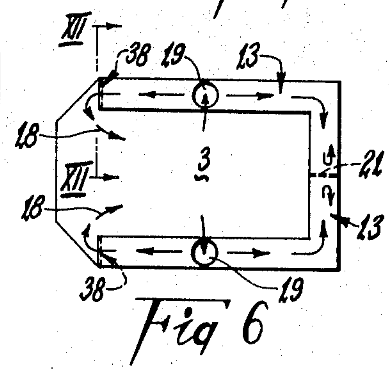
FIG. 6 is a diagrammatic plan view of a distribution duct arrangement for the vehicle of FIG. 1.

In addition, the distribution duct 13 preferably communicates with the plenum chamber 3 at or adjacent the front of the vehicle. In a typical arrangement as shown in FIG. 6, the vehicle is substantially rectangular in plan view and the duct 13 extends only along the two sides and across the rear of the vehicle. Also, with this arrangement the inner wall of the skirt is preferably omitted in the section of the skirt extending across the front of the vehicle. The front ends of the two side sections of the duct may or may not be open depending upon the particular vehicle construction. In any case, the duct 13 and skirt are arranged so that air passes from the front portion of each side section of the duct and into the plenum chamber so as to flow in a generally rearwards direction as shown by arrows 18 in FIG. 6.

Referring to FIGS. 4 to 6, it is further preferred that the duct 13 is divided into two separate units each of which receives air from the pressure supply means 4 through a separate inlet aperture 19 and respectively communicates with approximately half of the length of the skirt channel 10 over which the duct 13 is located. For example, a transverse partition wall 21 may be located approximately midway along the length of the rear portion of the duct 13 to separate the duct 13 into the two units, or alternatively those units may be constructed as independent members. The inlet aperture 19 for each duct unit may be located at any position other than the extreme front, but is preferably located just rearwardly of or adjacent the longitudinal center of the side section of its respective duct unit.

The inlet apertures 19 may be formed through the upper wall 14 of their respective duct units as shown in FIG. 4, and may be in substantial lateral alignment. In a preferred alternative arrangement as shown in FIG. 5, the inlet apertures 19 are formed through the inner sidewall 16 of their respective sections of the duct 13.

The pressure supply fan 4 may be disposed in between the two side sections of the duct 13 adjacent the inlet apertures 19, and appropriate feed conduit or ducts 22 connect the fan housing to each of the inlet apertures 19. Flow restriction means in the form of a flap valve 23 for example may be located within each inlet aperture 19 for a purpose hereinafter made clear.

In a preferred form of the plenum skirt as shown in FIGS. 8 and 9, the outer wall 12 includes an upper and a lower longitudinal section 24 and 26 respectively. The sections 24 and 26 are so arranged that in the inflated condition of the skirt, the upper section 24 adopts a curved and almost semicircular shape in transverse cross section and the lower section 26 extends tangentially from the lower edge of the upper section 24 so as to slope downwardly and inwardly as a substantially flat plate. It is preferred, although not essential, that the two sections 24 and 26 constitute a single sheet of material in the sense that there is no longitudinal join between them; but because of length and shape considerations it may be necessary to form the outer wall 12 from a plurality of sheet elements joined in end-to-end relationship.

The inner wall 11 of the skirt, where provided, preferably extends from the lower edge of the inner sidewall 16 of the duct 13 so as to slope downwardly and outwardly when the skirt is inflated. The lower edge portion of the inner wall of the skirt lies adjacent and is engageable with the corresponding edge portion of the lower section 26 of the outer wall 12, and consequently those two wall portions 11 and 26 are arranged to define a substantially V-shaped channel 10 between them in the inflated condition of the skirt. For convenience, the inner wall 11 of the skirt and the lower section 26 of the outer wall 12 will be hereinafter called sloping wall portions, and the upper section 24 of the outer wall 12 will be hereinafter called the curved wall portion.

It is preferred that the two sloping wall portions 11 and 26 extend at such an angle to each other that the forces acting within the skirt channel 10, when inflated, are substantially balanced. Such a condition may be achieved with the sloping wall portions 11 and 26 extending at substantially the same angle B (see FIG. 9) to the plane of the reaction surface S, assuming the vehicle is disposed substantially parallel to that surface S. In practise however, it is found that satisfactory results can be obtained with a difference of as much as 10° between the respective angles of slope B, although it can be expected that substantially greater differences will normally create such an imbalance of forces within the skirt channel 10 that collapse of the skirt may occur during use. It is further preferred that the included angle A (see FIG. 9) between the two sloping wall portions 11 and 26 is within the range of 80 to 110°, and best results appear to be obtainable with an included angle A of approximately 90°. The skirt may operate in a satisfactory fashion if the included angle A is greater than 110°, but operation has been found to deteriorate sharply with angles less than 80°. Still further, the sloping wall portion 26 preferably extends at an angle B or 45° or less to the reaction surface S, when the vehicle is substantially parallel to that surface.

A lip or flap 27 forming a continuation of the lower edge of the inner wall 11 of the skirt extends beneath the lower edge of the outer wall 12 thereof and laterally outwards to form part of a pressure equalizing valve 25 which functions as hereinafter described.

In the inflated condition of the skirt, the curved wall portion 24 extends laterally beyond the outer surface (wall 17) of the platform or hull 2, and the apex of the V-shaped channel 10 formed between the sloping wall portions 11 and 26 is disposed directly beneath or slightly inwards of that outer surface. The latter arrangement is preferred, because when the apex is disposed directly beneath the outer surface of the platform or hull 2, there is a possibility of that apex, or a portion thereof, moving outwardly of the outer surface during use thereby creating a condition under which collapse of the skirt may occur.

Nevertheless, the apex is preferably disposed as close as possible to the outside surface of the platform or hull 2 to provide a skirt arrangement which is such that the area of thrust of the air cushion against the underside of the vehicle and the skirt is substantially the same as the lateral or plan area of the platform or hull 2. Thus, the power required to lift the vehicle is minimized without sacrificing stability of the vehicle. If the apex is disposed outwardly of the outer surface, the skirt will be prone to collapse. Also, the further the apex is located inwardly of that surface, the greater the power required to lift the vehicle.

Means are provided for retaining the skirt in the desired shape when in its inflated condition. One form of such retaining means is shown in FIGS. 8 and 9, and includes a plurality of straps 28 formed of flexible material, which may be the same as that forming the skirt walls 11 and 12, secured to the inside of the skirt channel 10 at longitudinally spaced intervals. By way of example, the straps 28 may be spaced at approximately 2-foot intervals.

Each strap 28 preferably extends between and is attached to the opposite longitudinal edge portions of the curved wall portion 24, and extends transversely across and is attached to the inner surfaces of the two sloping wall portions 26 and 11. In the inflated condition of the skirt, one part 29 of the strap forms a chord for the curved wall portion 24, and a further part 31 thereof retains the lower edges of the two sloping wall portions 11 and 26 adjacent to one another.

In an alternative arrangement not shown in the drawings, separate strap parts may form the chord 29 of the curved wall portion 24 and the lower edge retainer 31 respectively. In such a case the respective strap parts need not be in alignment, and in fact there may be a greater number of one part than the other.

Figure 7:
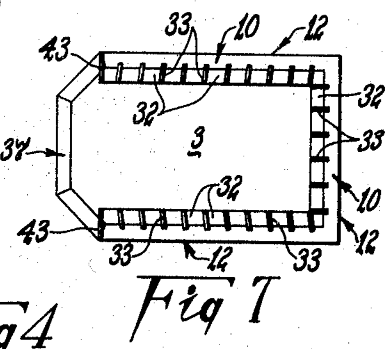
FIG. 7 is a diagrammatic plan view of a skirt arrangement for the vehicle of FIG. 1.

The skirt channel 10 is preferably divided into a plurality of separate open top compartments 32 by substantially transverse panels or partition walls 33 of a flexible material such as that from which the sidewalls 11 and 12 of the skirt are made (see FIGS. 7 to 9). Each partition wall 33 is secured to each sloping wall portion 11 and 26 of the skirt and thereby forms part of the retaining means by functioning to limit the lateral spacing between the two sloping wall portions 11 and 26, and particularly the upper edges thereof. Also, each partition wall 33 preferably has its upper edge 34 in substantial alignment with the upper edges of the sloping wall portions 11 and 26 as shown in FIG. 9. In an alternative arrangement shown in FIG. 10 however, the partition walls 33 may have their upper edges 34 extending between the upper edges of the walls 11 and 12, in which case the chords 29 may be dispensed with.

In the side sections of the skirt, each of the partition walls 33 may slope outwardly and rearwardly from the inner sidewall 11 of the skirt as shown in FIG. 7, for a reason hereinafter made clear. By side sections, it is meant any section of the skirt not extending transverse to the intended direction of travel of the vehicle.

Alternative to the partition walls 33, the sloping wall portions 11 and 26 may be retained in their correct lateral relationship by a plurality of transverse straps 36 as shown in FIG. 11. Preferably, there is a plurality of longitudinally spaced groups of straps 36, each strap 36 being secured at its opposite ends to a respective one of the sloping wall portions 11 and 26. In such a case two or more straps 36 are located one above the other to take the place of each partition wall 33, and the straps 36 may be made from a flexible material such as that used for the skirt walls 11 and 12.

Although there is no inner wall 11 of the skirt at the front section 37 (see FIG. 7) thereof, partition walls (not shown) or their equivalent may be provided. Preferably, such partition walls are of the same general construction as the walls 33 previously described, which walls are substantially triangular in shape. Each partition wall of the front skirt section 37 has one side of the triangle attached to the sloping portion 26 of the front wall 12 as in the case of the other skirt sections, and the opposite corner portion of the triangle is secured to a rigid part of the vehicle such as the lower edge portion of the inner sidewall of the distribution duct.

The front ends of the respective side sections of the skirt channel 10 and the duct 13 preferably communicate with the plenum chamber 3 through a nonreturn valve 38 as shown in FIG. 6 and 12. Preferably, each valve 38 includes a rigid plate 39 provided with perforations 41 and one or more flexible flaps 42 secured to the plate 39. The flaps 42 are adapted to engage the plate 39 so as to close the perforations 41 and to move away from the plate 39 to allow fluid flow through the perforations 41, according to the pressure differential between the plenum chamber 3 of the duct 13. A flexible panel 43 preferably closes off the front end of each side section of the skirt channel 10 as shown in FIGS. 7 and 12.

Means for attaching the skirt walls 11 and 12 to the platform or hull 2 is preferably such that the skirt can be quickly and easily removed for repair or replacement. Preferably, a different type of attaching means is provided for the inner and outer walls 11 and 12 respectively of the skirt.

One form of inner wall attaching means is shown in FIG. 13, and includes a laterally outwardly extending ledge 44 attached to or formed integral with the lower edge portion of the inner sidewall 16 of the distribution duct 13. A plurality of upstanding fastening members such as pillars 46 may be secured along the upper surface of the ledge 44 in longitudinally spaced relationship, and eyelets 47 or other suitable openings are provided along the upper edge portion of the inner wall 11 of the skirt for location over a respective one of the fastening pillars 46. A key member 48 may be pivotally mounted adjacent the upper end of each pillar 46 for manual movement into and out of a position in which it resists detachment of the skirt wall 11 from its respective pillar 46.

The outer wall attaching means may be as shown in FIG. 14, in which case it includes a cord, rope or any other flexible bulking member 49, located within a longitudinally extending pocket formed along the upper edge portion of the outer wall 12 of the skirt by that edge portion being turned back upon itself and secured to an overlapped portion of the wall. An attaching strip 51 is secured to the lower edge portion of the outer sidewall 17 of the distribution duct 13 for cooperation with the bulked edge of the skirt wall 12. The attaching strip 51 is preferably made from extruded aluminum or any other lightweight and corrosion resistant metal, but may be made from any other suitable material such as a relatively hard plastics material, and may be formed in any suitable manner.

In one form as shown in FIG. 14, the attaching strip 51 includes a body portion 52 of any appropriate shape in transverse cross section but having a relatively flat inner surface for engaging the outer surface of the platform or hull 2. A skirt retaining leg 53 extends downwardly and inwardly from the outer surface of the body portion 52, and that leg 53 may be of substantially L-shape for example in transverse cross section. The strip 51 may be secured to the platform or hull 2 by a plurality of fastening elements such as screws 54.

The arrangement is such that when the strip 51 is assembled with the platform or hull 2, a cavity 56 is defined between the adjacent surfaces of the platform or hull 2, and the retaining leg 53, and that cavity 56 is adapted to receive the bulked edge portion of the skirt wall 12. A space 57 is left between the inner edge of the retaining leg 53 and the adjacent surface of the platform or hull 2 so as to allow passage of one or two layers of the skirt material, but the space 57 is not large enough to allow lateral movement of the bulked edge portion of the skirt wall 12 out of its cavity 56.

The skirt wall 12 is attached to the strip 51 by feeding the bulked edge portion longitudinally through the cavity 56. As a result it is an extremely simple matter to remove and replace a skirt respectively from and to the vehicle. Also, because of the particular construction of the attaching means, pressure within the skirt channel 10 functions to retain the upper edge portions of the skirt walls 11 and 12 against adjacent rigid surfaces so as to form substantially fluid-tight seals at those upper edge portions.

In the vehicle described, air under pressure is fed to the plenum chamber 3 only by way of the distribution duct 13 and skirt channel 10. It will be appreciated however, that a second avenue of supply may be provided, such as through an aperture or duct communicating directly with the top of the plenum chamber 3, preferably at an intermediate zone thereof which may be at or adjacent the center. In such a case the same pressure supply means may feed air into both avenues of supply for the plenum chamber 3, although a different supply means may be provided if desired.

Surface engaging means may be provided on the vehicle so as to support the vehicle when it is stationary or inoperative in the sense that the air cushion is not produced to lift the vehicle from its reaction surface S. The surface engaging means is preferably such that the skirt is substantially protected against damage, and may include two or more laterally spaced runners or slides 58 disposed within the plenum chamber 3 and extending generally in the longitudinal direction of the vehicle (see FIG. 4). Alternatively, wheels or continuous tracts may form the surface engaging means so as to enable travel of the vehicle over the ground when the air cushion is inoperative.

Having now described the principal component parts of a preferred practical embodiment of the invention, the operation thereof is as follows.

Air under pressure is supplied to each unit of the distribution duct 13 through its respective inlet aperture 19 as previously described. The air is directed into the skirt channel 10 thereby inflating it, and passes from the front end portions of the distribution duct 13 into the plenum chamber 3. Because of the particular skirt construction and more especially the pressure equalizing valve 25, there is little or no escape of air from the skirt channel 10 between the lower edges of the sidewalls 11 and 12 thereof. That is, at least whilst the pressures within the skirt channel 10 and the plenum chamber 3 respectively are substantially equal.

Under conditions of equal pressures in the channel 10 and chamber 3, the inner wall 11 of the skirt, where provided, functions as a relatively rigid flat member and the respective lower edges of the sloping wall portions engage to prevent escape of air therebetween (see FIG. 9). Also under such conditions, the pressure equalizing valve lip 27 engages the reaction surface S (e.g., the ground) to prevent or minimize escape of air from the plenum chamber 3 by passing beneath the skirt.

Figure 15:
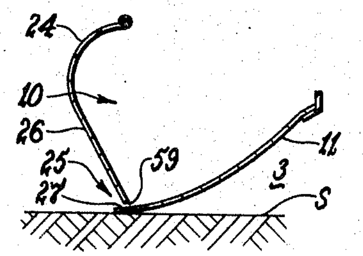
FIG. 15 is a diagrammatic cross-sectional view of the skirt assembly in a condition in which the pressure within the skirt is greater than that within the plenum chamber.
Figure 16:
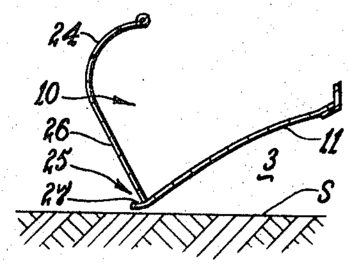
FIG. 16 is a view similar to FIG. 15, but showing a condition in which the pressure within the plenum chamber is greater than that within the skirt.

If, however, a pressure differential is created between the skirt channel 10 and the plenum chamber 3, the pressure equalizing valve 25 will allow escape of air from whichever is subjected to the higher pressure. That is, if the pressure within the skirt channel 10 is greater than that within the plenum chamber 3, the inner wall 11, where provided, will buckle as shown in FIG. 15 thereby causing relative movement of the lower edges of the skirt walls 11 and 12 such that air escapes from the skirt channel 10 through a passage 59 formed between those lower edges. On the other hand, if the pressure within the plenum chamber 3 is greater than that within the skirt channel 10, the wall 11 will buckle as shown in FIG. 16 thereby closing the passage 59, and the valve lip 27 will lift away from the ground allowing escape of air therebeneath from the plenum chamber 3.

In actual practice, there will be an almost continuous discharge of air beneath the skirt from the plenum chamber 3. That airflow thereby produces a lubrication effect for passage of the skirt over the reaction surface S.

It will be clear to people skilled in the particular art that the skirt construction described is such as to function with substantially static pressure. That is, escape of air from the skirt channel 10 is resisted and held to a minimum, which is contrary to conventional skirt structures which rely upon a continuous discharge or "curtain" of air for proper function.

If the vehicle is operating over water, it is possible that some water will enter into the skirt channel 10. The rearwardly sloping partition walls 33 of the side sections of the skirt facilitate drainage of the collected water from those sections between the lower edges of the skirt sidewalls 11 and 12 when those edges separate to form passage 59.

As previously mentioned, the vehicle is caused to move over its reaction surface S by one or more rotating propellers 6. When it is desired to change the direction of travel, the steering vane or vanes 7 may be actuated in an appropriate manner. Such actuation, however, produces yaw which in itself may not be sufficient to effect the necessary direction change. Consequently in the preferred embodiment of the invention, the vehicle is caused to roll towards the desired new direction of travel so that the combination of yaw and roll function to change the direction of travel in the same manner as achieved in an airplane.

The required roll is produced by partially collapsing the appropriate side of the skirt channel 10. Such partial collapse is effected through the aforementioned flap valve 23 (FIGS. 4 and 5) at the inlet aperture 19 for that respective side. That is, the valve 23 includes a member 61 which is moved to a position to restrict passage of air into the respective section of the duct 13 from the supply fan 4. It is thought that the desired partial collapse is caused primarily by turbulence created in the adjacent duct section and adjacent skirt section by the restriction to airflow through the inlet aperture 19. This proposition is reinforced by the discovery that complete closing of the respective inlet aperture 19 does not result in the desired collapse, and in such a case the air necessary to maintain inflation of the respective side of the skirt is received from the other side of the duct 13.

In view of the above, each flap valve 23 is preferably constructed so as to be incapable of completely closing its respective inlet aperture 19. For example, each valve member 61 may have a smaller surface area than the area of its respective inlet opening 19. Also, each valve member 61 is preferably mounted for pivotal movement about a substantially central axis 62 extending in the general direction of the adjacent duct section. Thus, in the fully open or upright position of the valve member 61, it is disposed with its surface transverse to the direction of airflow from the fan 4 to the distribution duct 13.

In the arrangement of FIG. 4, it is further preferred that the upper edge portion 63 of each valve member 61, relative to the open position thereof, is formed so as to have an aerodynamic shape which assists in directing airflow from the fan 4 into and through the respective inlet aperture 19. Such shaping of the member 61 however, is not necessary with the arrangement of FIG. 5.

Figure 1:
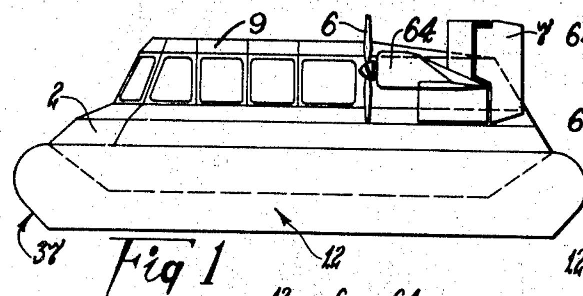
FIG. 1 is a side elevational view of a typical vehicle incorporating the invention.

Although one drive propeller 6 is considered sufficient in most cases, two such propellers may be located adjacent the rear of the vehicle in laterally spaced relationship and driven through individual power sources 64 as shown in FIGS. 1 to 3. With such an arrangement it is possible to vary the thrust of the two propellers 6 and thereby correct yaw and/or offset drift of the vehicle. In addition, such dual propellers 6 may assist in producing a change of direction of the vehicle.

According to a preferred form of the vehicle hereinbefore described, the front and rear sections of the skirt are raised so as to minimize drag during movement of the vehicle over a reaction surface S.

The invention has been so far described in relation to an air cushion vehicle of the type in which the flexible skirt defines the entire periphery of the plenum chamber 3. The invention however, is equally applicable to other types of air cushion vehicles such as the so-called "sidewall" type. That is, a vehicle as shown in FIG. 17 and in which the plenum chamber 3 is defined between two laterally spaced rigid sidewalls 66 and front and rear flexible skirt sections 67 and 68 extending between those sidewalls.

Figure 17:
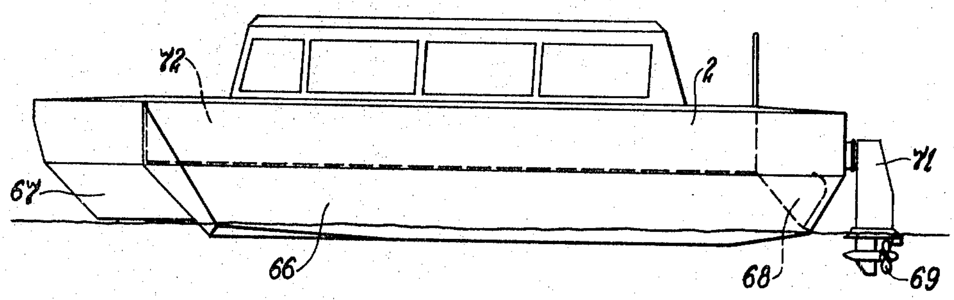
FIG. 17 is a side elevational view of another form of vehicle which is adapted to incorporate the invention.
Figure 18:
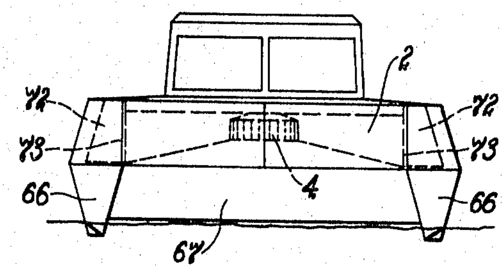
FIG. 18 is a front elevational view of the vehicle shown in FIG. 17.

The particular sidewall vehicle shown in FIGS. 17 and 18 is adapted for use as a water craft. The sidewalls 66 are preferably constructed so that in transverse cross section their respective inner and outer surfaces converge downwardly (see FIG. 18), and the arrangement is such that the width between the lower adjacent edges of the sidewalls 66 is substantially equal to the width of the platform or hull 2.

As a water craft, propulsion may be achieved by one or more submerged propellers 69 each of which is driven by an inboard or outboard motor 71 as desired. Also in such a case, steering of the vehicle may be effected by a conventional rudder system.

The distribution duct 72 may be of substantially the same basic construction as that of the previous embodiment, except that it is not open at the under side along the side sections thereof and flap valves are not required in the inlet apertures 73, as there are no side skirt sections on the vehicle. The duct 72 may or may not be divided into two separate units according to requirements, and air may be discharged from the duct 72 into the front and rear sections 67 and 68 of the skirt and the plenum chamber 3 in the same manner as previously described.

The construction of the front and rear skirt sections 67 and 68 may be substantially the same as the corresponding sections of the previous embodiment. Thus, the sidewall type of vehicle incorporating the invention enjoys the same advantages as to stability and power requirements as conferred upon the first described embodiment by the invention.

It will be appreciated from the foregoing description that a flexible skirt constructed according to the present invention has valuable practical advantages over prior skirt constructions for air cushion vehicles. In particular, the load bearing area of the improved skirt is increased by virtue of its novel cross-sectional shape so that the area and weight of the platform or hull may be kept to a minimum. Also, the stability of the vehicle incorporating a skirt according to the invention is improved because of the substantially balanced forces acting within the skirt, and the ability of the skirt valve to substantially equalize pressure existing in the skirt and plenum chambers respectively. Still further, the area of thrust created by such a skirt construction is such as to minimize the power required to obtain lift of the associated vehicle.

I claim:

1. A flexible structure for defining at least part of the periphery of a plenum chamber of an air cushion vehicle, said structure including, a pair of walls defining between them an open-top channel adapted to receive fluid under pressure from pressure supply means attached to said vehicle, means attaching the upper edge portion of each said wall to said vehicle so that one of said walls is innermost relative to said plenum chamber, means retaining the lowermost edge portions of the walls adjacent each other, at least a section of said lowermost edge portions being separable to define a fluid passage therebetween, the lowermost edge of the outer wall being engageable with the lowermost edge portion of the inner wall to close said fluid passage, and a lip forming a continuation of said lowermost edge portion of said inner wall and extending laterally outwards beyond the lowermost edge portion of said outer wall, said lip being engageable with a reaction surface over which the vehicle is positioned to regulate escape of air from said plenum chamber beneath said flexible structure.

2. A structure according to claim 1, wherein said outer wall includes an upper section and a lower section, said upper section being arranged to extend outwardly and downwardly from said outer wall attaching means, said lower section being arranged to extend downwardly and inwardly from said upper section, and said inner wall being arranged to extend downwardly and outwardly from its attaching means.

3. A structure according to claim 2, wherein, when inflated, said upper section is curved and said lower section is a substantially flat panel extending tangentially from the curved upper section, and said inner wall is a substantially flat panel.

4. A structure according to claim 3, wherein, when inflated, the included angle defined between said inner wall and the lower section of the outer wall is within the range of 80 to 110°.

5. A flexible structure for defining at least part of the periphery of a plenum chamber of an air cushion vehicle, said structure including, a pair of walls defining between them an open-top channel adapted to receive fluid under pressure from pressure supply means attached to said vehicle, means attaching the upper edge portion of each said wall to said vehicle so that one of said walls is innermost relative to said plenum chamber, the outermost wall including an upper section and a lower section, said upper section being arranged to extend outwardly and downwardly from said outer wall attaching means and said lower section being arranged to extend downwardly and inwardly from said upper section, said inner wall being arranged to extend downwardly and outwardly from its attaching means, means retaining the lowermost edge portions of said walls adjacent each other, at least a section of said lowermost edge portions being separable to define a fluid passage therebetween, the lowermost edge portion of said outer wall being engageable with the lowermost edge portion of the inner wall to close said fluid passage, and a lip forming a continuation of the lowermost edge portion of said inner wall and extending laterally outwards beyond the lowermost edge portion of said outer wall, said lip being engageable with a reaction surface over which the vehicle is positioned to regulate escape of air from said plenum chamber beneath said flexible structure.

6. A structure according to claim 5, wherein said retaining means includes a plurality of flexible straps located inside of said channel at longitudinally spaced intervals therealong, each said strap being secured to both of said walls.

7. A structure according to claim 6 wherein each said strap extends transversely of the longitudinal axis of said channel and is secured along the adjacent surfaces of said inner wall and said lower section of the outer wall, and to the upper edge portion of said upper section of the outer wall, said upper section being curved whereby part of each said strap forms a chord of the curved upper section of the outer wall when the flexible structure is inflated.

8. A structure according to claim 6, wherein said retaining means includes a plurality of further flexible straps located within said channel, each said further strap extending transverse of the channel and having its opposite end portions secured to a respective one of said walls, and wherein there are a plurality of longitudinally spaced groups of said further straps, the straps in each group being located one above the other.

9. A structure according to claim 5, wherein said retaining means includes a plurality of longitudinally spaced flexible panels secured inside said channel to both of said walls and extending transversely of the channel so dividing it into a plurality of open top compartments.

10. An air cushion vehicle including a plenum chamber; a load supporting platform; a distribution duct attached to said platform; pressure supply means attached to said platform and in communication with said duct for feeding fluid under pressure into said duct; and a flexible structure defining at least part of said plenum chamber and having a pair of walls defining between them an open top channel receiving fluid under pressure from said duct, means attaching the upper edge portion of each said wall to said platform so that one of said walls is innermost relative to said plenum chamber, means retaining the lowermost edge portions of the walls adjacent each other, at least a section of said lowermost edge portions being separable to define a fluid passage therebetween, the lowermost edge portion of said outer wall being engageable with the lowermost edge portion of said inner wall to close said fluid passage, and a lip forming a continuation of the lowermost edge portion of said inner wall and extending laterally outwards beyond the lowermost edge portion of said outer wall, said lip being engageable with a reaction surface over which the vehicle is positioned to regulate escape of air from said plenum chamber beneath said flexible structure.

11. A vehicle according to claim 10, wherein said fluid passage is disposed in substantially vertical alignment with the adjacent peripheral edge of said platform when said flexible structure is inflated and when said platform is substantially parallel to the plane of said reaction surface.

12. A vehicle according to claim 11, wherein said lowermost edge portion of each said wall of the flexible structure slopes upwardly at substantially the same angle to the plane of said reaction surface, when said flexible structure is inflated and said platform is substantially parallel to that plane.

13. A vehicle according to claim 10, wherein the periphery of said plenum chamber is defined at least in part by a pair of laterally spaced rigid sidewalls extending generally in the intended direction of travel of said vehicle, a flexible skirt extending between front end portions of said sidewalls, and said flexible structure extending between the rear end portions of said sidewalls.

14. A vehicle according to claim 10, wherein said means attaching said inner wall to said vehicle includes, an elongated ledge secured to said vehicle so as to extend generally in the longitudinal direction of said flexible structure and outwardly relative to said plenum chamber, a plurality of pillars secured in spaced relationship along said ledge and projecting upwardly therefrom, a plurality of eyelets through the upper edge portion of said inner wall, each said eyelet being locatable over a respective one of said pillars, and a key member pivotably mounted on each said pillar for movement into a position in which it resists removal of said inner wall from the respective pillar.

15. A vehicle according to claim 10, wherein said means attaching said outer wall to said vehicle includes an elongated attaching strip extending generally in the longitudinal direction of said flexible structure and having a body portion secured to a surface of said vehicle, a retaining leg extending downwardly from said body portion and spaced from said surface of the vehicle so as to define a cavity therebetween, a flexible bulking member secured to the upper edge portion of the outer wall and extending longitudinally thereof, said bulking member being located within said cavity, and part of said retaining leg extending inwardly towards said plenum chamber and located beneath said bulking member to prevent lateral withdrawal thereof from said cavity.

16. An air cushion vehicle including a plenum chamber; a load supporting platform; a distribution duct attached to said platform; pressure supply means attached to said platform and in communication with said duct for feeding fluid under pressure into said duct; and a flexible structure defining at least part of said plenum chamber and having a pair of walls defining between them an open-top channel receiving fluid under pressure from said duct, means attaching the upper edge portion of each said wall to said platform so that one of said walls is innermost relative to said plenum chamber, means retaining the lowermost edge portions of the walls adjacent each other, at least a section of said lowermost edge portions being separable to define a fluid passage therebetween, the lowermost edge portion of said outer wall being engageable with the lowermost edge portion of said inner wall to close said fluid passage, and a lip forming a continuation of the lowermost edge portion of said inner wall and extending laterally outwards beyond the lowermost edge portion of said outer wall, said lip being engageable with a reaction surface over which the vehicle is positioned to regulate escape of air from said plenum chamber beneath said flexible structure; the periphery of said plenum chamber being defined by laterally spaced side sections of said flexible structure which extend generally in the intended direction of travel of said vehicle, a rear section of said flexible structure extending between and communicating with the rear end portions of the said side sections, and a flexible skirt extending between the front end portions of said side sections.

17. A vehicle according to claim 16, wherein said duct is divided into two separate units each of which is arranged to supply fluid under pressure to a respective part of the flexible structure, each said duct unit having a respective inlet aperture through which fluid is receivable from the pressure supply source.

18. A vehicle according to claim 17, wherein a flap valve is provided within each said inlet aperture, each said flap valve including a valve member which is pivotable about an axis extending generally in the longitudinal direction of the adjacent section of the distribution duct, and each said valve member is incapable of completely closing its respective inlet aperture.

19. A vehicle according to claim 18, wherein the upper edge portion of each said valve member, relative to the open position thereof, is provided with an aerodynamic shape so as to assist in directing fluid flow from the pressure supply source through the respective inlet aperture.

20. A vehicle according to claim 16, wherein said front ends of said side sections of said flexible structure communicate with said plenum chamber respectively through an adjacent section of the distribution duct, and a nonreturn valve is provided at the front end of each said duct section, each said valve being operable to allow transfer of fluid from said duct sections and flexible structure to said plenum chamber and to substantially prevent transfer of fluid from the plenum chamber to said duct sections and flexible structure.

21. A vehicle according to claim 20, wherein a flexible panel is provided over the front end of each said side section of the flexible structure, and each said nonreturn valve includes a rigid perforated plate and a flexible flap secured to said plate so that part thereof overlies the perforated section of said plate, said flap part being movable to engage or to be spaced from said perforated section.